US009544808B2

(12) United States Patent
Kalapatapu et al.

(10) Patent No.: US 9,544,808 B2
(45) Date of Patent: Jan. 10, 2017

(54) SYSTEMS AND METHODS FOR NETWORK DISCOVERY AND SELECTION USING CONTEXTUAL INFORMATION

(71) Applicant: Broadcom Corporation, Irvine, CA (US)

(72) Inventors: Dutt Kalapatapu, Santa Clara, CA (US); Kamesh Medapalli, San Jose, CA (US); Ahmad Rahmati, San Carlos, CA (US)

(73) Assignee: Broadcom Corporation, Irvine, CA (US)

( * ) Notice: Subject to any disclaimer, the term of this patent is extended or adjusted under 35 U.S.C. 154(b) by 132 days.

(21) Appl. No.: 14/149,681

(22) Filed: Jan. 7, 2014

(65) Prior Publication Data

US 2014/0192643 A1   Jul. 10, 2014

Related U.S. Application Data

(60) Provisional application No. 61/750,290, filed on Jan. 8, 2013.

(51) Int. Cl.
*H04W 4/00* (2009.01)
*H04W 28/02* (2009.01)
(Continued)

(52) U.S. Cl.
CPC ........ *H04W 28/0236* (2013.01); *H04W 48/00* (2013.01); *H04W 48/16* (2013.01)

(58) Field of Classification Search
USPC ........ 370/229, 230, 235, 236, 252, 331, 338
See application file for complete search history.

(56) References Cited

U.S. PATENT DOCUMENTS

| 2011/0110300 | A1* | 5/2011 | Sachs | H04W 48/18 370/328 |
| 2011/0317571 | A1* | 12/2011 | Kokkinen | H04W 24/00 370/252 |

(Continued)

FOREIGN PATENT DOCUMENTS

EP   2 437 546 A1   4/2012

OTHER PUBLICATIONS

European Search Report directed to related European Patent Application No. 14 00 0053, European Patent Office, Munich Germany, mailed Apr. 22, 2014; 3 pages.

(Continued)

*Primary Examiner* — Kwang B Yao
*Assistant Examiner* — Nguyen Ngo
(74) *Attorney, Agent, or Firm* — Sterne, Kessler, Goldstein & Fox P.L.L.C.

(57) ABSTRACT

A communication device and method for offloading communications from a first communication network to a second communication network. The offloading decision can be based on one or more parameters defined in a communication framework. The communication framework can be, for example, Access Network Discovery and Selection Function (ANDSF) framework. The offloading of communication can be from a Long-term Evolution (LTE) network to a Wi-Fi network, or vice-versa. The communication framework can include, for example, positional, movement, signal quality, connection duration, a data rate, and/or quality of service (QoS) parameters.

20 Claims, 7 Drawing Sheets

(51) Int. Cl.
*H04W 48/00* (2009.01)
*H04W 48/16* (2009.01)

(56) References Cited

U.S. PATENT DOCUMENTS

| | | | |
|---|---|---|---|
| 2012/0023189 A1* | 1/2012 | Giaretta et al. | 709/217 |
| 2012/0196644 A1 | 8/2012 | Scherzer et al. | |
| 2012/0324100 A1* | 12/2012 | Tomici et al. | 709/224 |
| 2013/0051251 A1* | 2/2013 | Wang | H04W 4/027 370/252 |
| 2013/0083661 A1* | 4/2013 | Gupta | H04W 4/005 370/235 |
| 2013/0265879 A1* | 10/2013 | Qiang | 370/235 |
| 2013/0310030 A1* | 11/2013 | Ventimiglia et al. | 455/434 |
| 2014/0010221 A1* | 1/2014 | Panian et al. | 370/338 |
| 2014/0040504 A1* | 2/2014 | Gupta | 709/244 |
| 2014/0064068 A1* | 3/2014 | Horn et al. | 370/230 |
| 2014/0079022 A1* | 3/2014 | Wang et al. | 370/331 |
| 2014/0160994 A1* | 6/2014 | Garcia Martin et al. | 370/259 |
| 2014/0192642 A1 | 7/2014 | Medapalli | |
| 2014/0219242 A1* | 8/2014 | Perras | H04W 8/082 370/331 |
| 2014/0226487 A1* | 8/2014 | Forssell et al. | 370/235 |
| 2014/0341076 A1* | 11/2014 | Orlandi et al. | 370/254 |
| 2015/0092553 A1* | 4/2015 | Sirotkin et al. | 370/235 |

OTHER PUBLICATIONS

"3$^{rd}$ Generation Partnership Project; Technical Specification Group Radio Access Network; Feasibility Study for Enhanced Uplink for UTRA FDD; (Release 6)," 3GPP TR 25.896, 3$^{rd}$ Generation Partnership Project, Valbonne, France, Mar. 2004; 180 pages.

Medepalli, K., et al., "Throughput Analysis of IEEE 802.11 Wireless LANs using an Average Cycle Time Approach," Proceedings of IEEE Globecom 2005; pp. 3007-3011.

Office Action directed to related European Patent Application No. 14 000 053.0, mailed on Dec. 15, 2014; 6 pages.

* cited by examiner

SYSTEMS AND METHODS FOR NETWORK DISCOVERY AND SELECTION USING CONTEXTUAL INFORMATION

CROSS REFERENCE TO RELATED APPLICATIONS

This patent application claims the benefit of U.S. Provisional Patent Application No. 61/750,290, filed Jan. 8, 2013, entitled "Mobile Device Using Contextual Information For Network Discovery and Selection," which is incorporated herein by reference in its entirety.

BACKGROUND

Field

This application relates generally to wireless communications, including the reduction of upstream control channel resources and inter-system offloading within a communication environment.

Related Art

The cellular network industry and service providers have been developing inter-system offloading solutions to alleviate congestion within communication environments by delivering data originally targeted for cellular networks to one or more other complementary technologies such as Wi-Fi. Inter-system offloading can reduce congestion issues and provide flexible bandwidth for load-balancing.

Conventional offloading solutions, such as 3GPP I-WLAN architecture as set forth in the 3GPP TS 23.234 specification, which is incorporated herein by reference in its entirety, relies on policies stored in mobile devices with pre-configured conditions to effectuate offloading.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG, 6 illustrates a flowchart of an offloading method according to an exemplary embodiment of the present disclosure.

Figure 7:
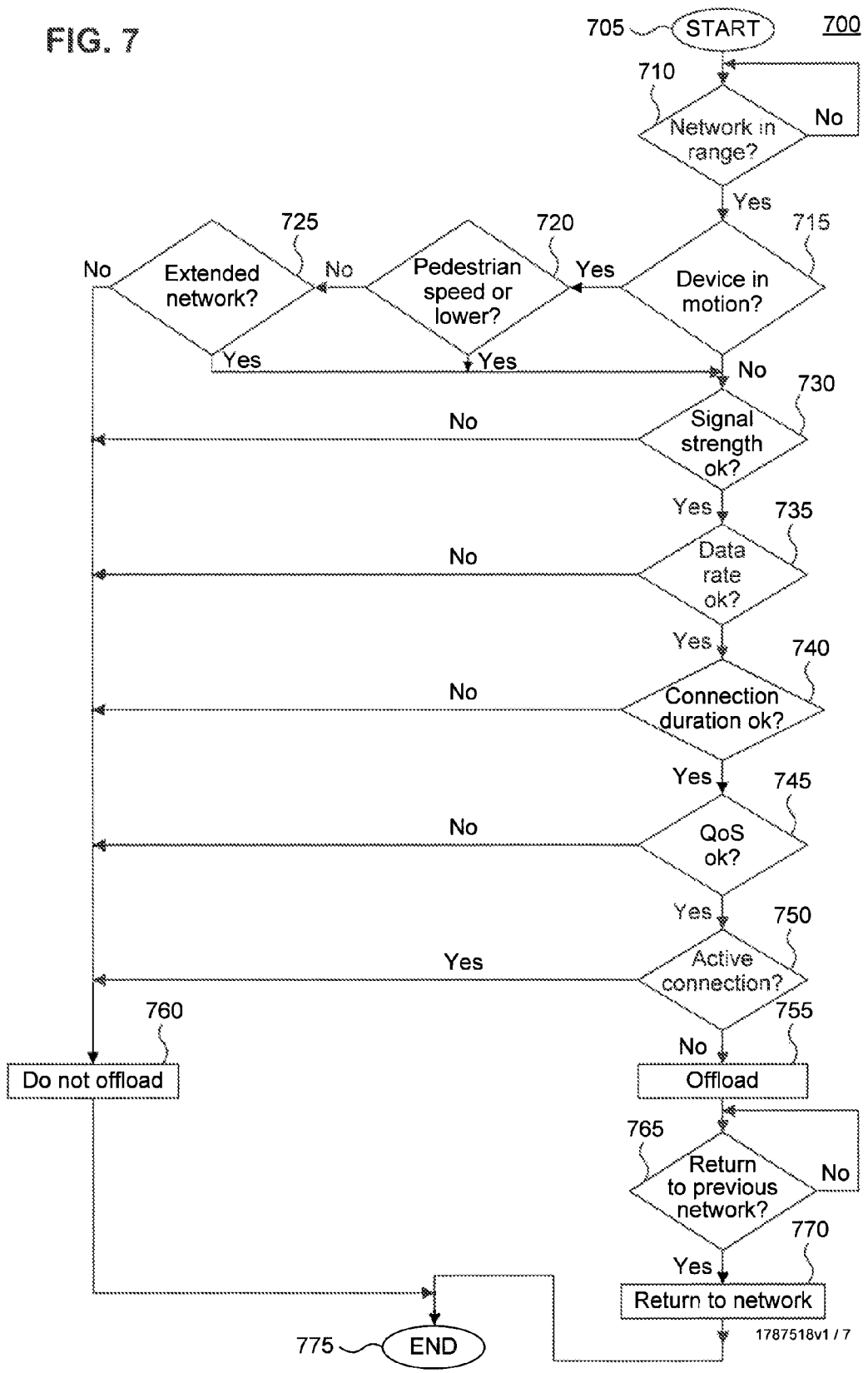

FIG. 7 illustrates a flowchart of an offloading method according to an exemplary embodiment of the present disclosure The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, all of which are incorporated by reference in their entirety. Further, although exemplary embodiments are described with reference to LTE, the more generic terms "mobile device" and "base station" are used herein except where otherwise noted to refer to the LTE terms "User Equipment (UE)" and "eNodeB/eNB," respectively.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) Wi-Fi (IEEE 802.11), Bluetooth, Near-field Communication (NFC) (ISO/IEC 18092), ZigBee (IEEE 802.15.4), and/or Radio-frequency identification (RFID), to provide some examples. These various standards and/or protocols are each incorporated by reference in their entirety.

Figure 1:
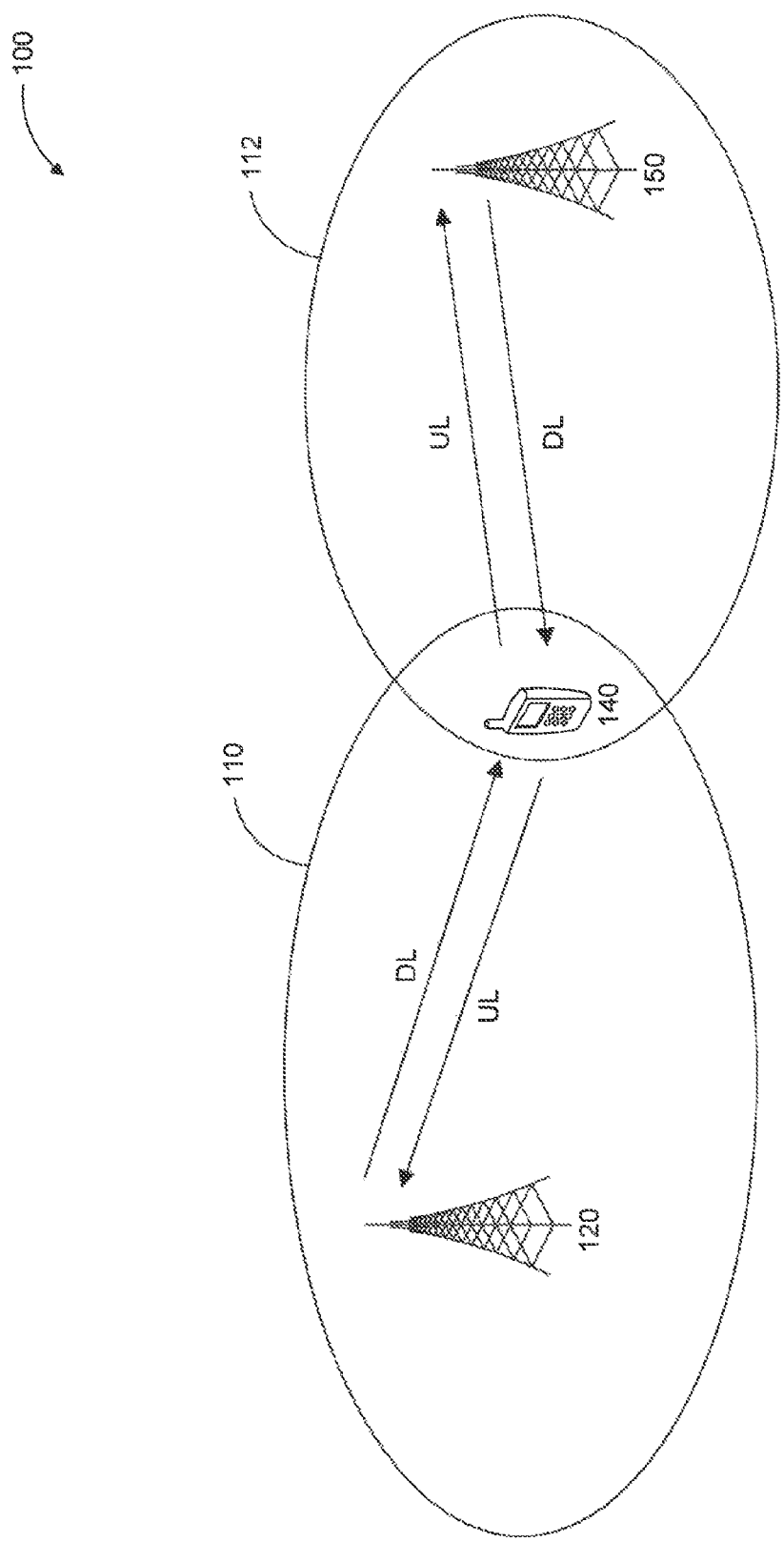
FIG. 1 illustrates an example network environment.

FIG. 1 illustrates an example communication environment 100 that includes a base station 120, a mobile device 140, and an access point (AP) 150. The base station 120, mobile device 140, and AP 150 each include suitable logic, circuitry, and/or code that is configured to communicate via one or more wireless technologies, and the mobile device 140 is further configured to support co-existing wireless communications. The mobile device 140 can include, for example, a transceiver having suitable logic, circuitry, and/or code that is configured to transmit and/or receive wireless communications via one or more wireless technologies within the communication environment 100. The base station 120 and AP 150 each include suitable logic, circuitry, and/or code that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include one or more wireless protocols discussed above.

As described in more detail below, the communication environment 100 can utilize inter-system offloading between 3GPP and non-3GPP access networks. For example, the communication environment 100 can be configured to offload wireless communications within a Long-Term Evolution (LTE) access network to a Wi-Fi wireless local access network (WLAN).

The mobile device 140 can be configured to communicate with the base station 120 in a serving cell or sector 110 of the communication environment 100, and/or communicate with the access point (AP) 150 in a wireless local access network (WLAN) 112. For example, the mobile device 140 receives signals on one or more downlink (DL) channels and transmits signals to the base station 120 and/or the AP 150 on one or more respective uplink (UL) channels.

In an exemplary embodiment, the base station 120 includes suitable logic, circuitry, and/or code that is configured for communications conforming to 3GPP's LTE specification (e.g., the base station is an LTE base station), the AP 150 includes suitable logic, circuitry, and/or code that is configured for communications conforming to IEEE's 802.11 Wi-Fi specification (e.g., the AP 150 is a Wi-Fi access point), and mobile device 140 includes suitable logic, circuitry, and/or code that is configured for communications conforming to 3GPP's LTE specification and IEEE's 802.11 Wi-Fi specification. That is, the mobile device 140 is configured to wirelessly communicate with the base station 120 utilizing 3GPP's LTE specification and with the AP 150 utilizing IEEE's 802.11 Wi-Fi specification. Here, the serving cell or sector 110 is an LTE serving cell or sector and the WEAN 112 is a WLAN utilizing the 802.11 Wi-Fi specification.

Examples of the mobile device 140 include (but are not limited to) a mobile computing device—such as a laptop computer, a tablet computer, a mobile telephone or smartphone, a "phablet," a personal digital assistant (PDA), mobile media player, and the like; and a wearable computing device—such as a computerized wrist watch or "smart" watch, computerized eyeglasses, and the like. In some embodiments, the mobile device 140 may be a stationary device, including, for example, a stationary computing device—such as a personal computer (PC), a desktop computer, a computerized kiosk, an automotive/aeronautical/maritime in-dash computer terminal, and the like.

Figure 2:
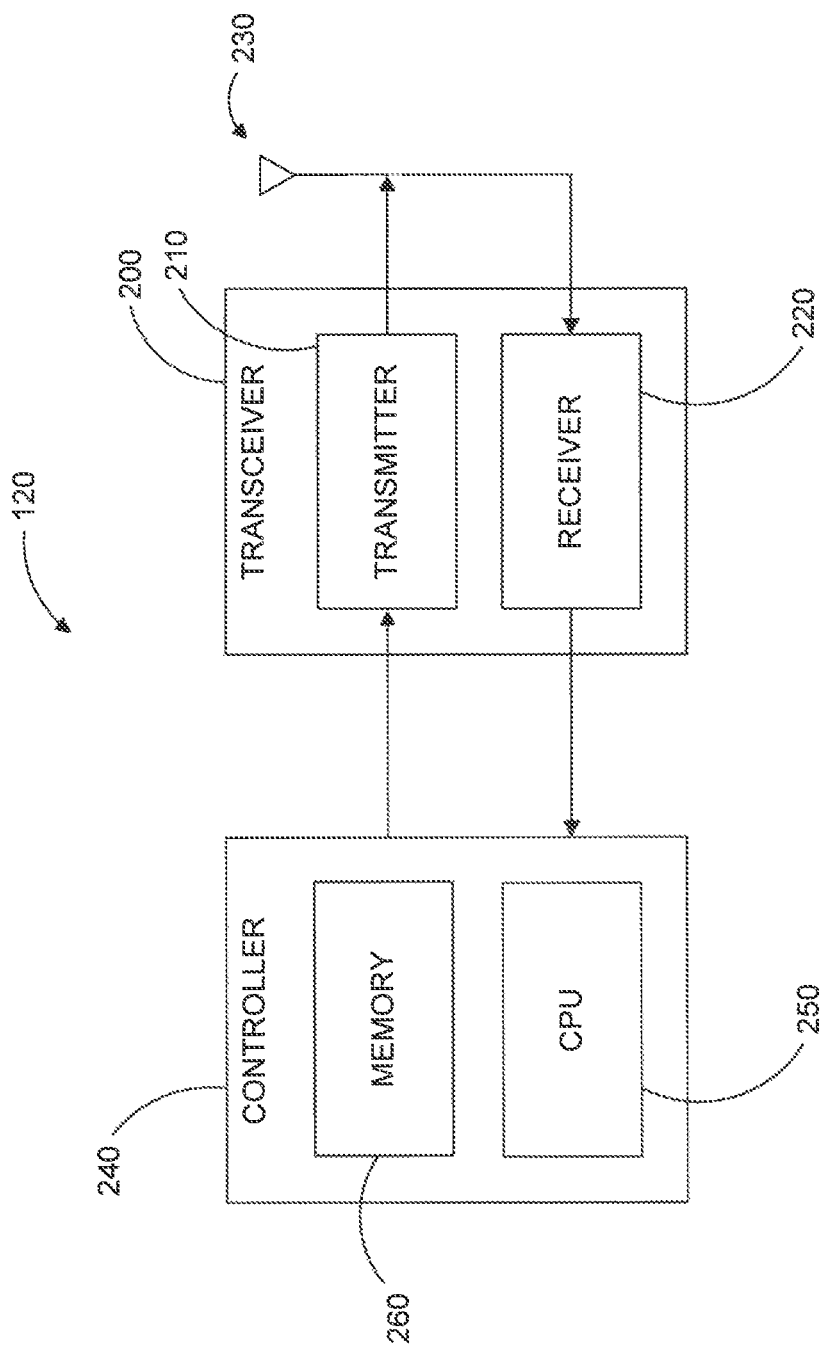
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to a controller 240.

The transceiver 200 includes suitable logic, circuitry, and/or code that is configured to transmit and/or receive wireless communications via one or more wireless technologies within the communication environment 100. In particular, the transceiver 200 can include a transmitter 210 and a receiver 220 that have suitable logic, circuitry, and/or code configured to transmit and receive wireless communications, respectively, via one or more antennas 230. Those skilled in the relevant art(s) will recognize that the processes for transmitting and/or receiving wireless communications can include (but are not limited to) digital signal processing, modulation and/or demodulation of data, digital-to-analog (DAC) and/or analog-to-digital (ADC) conversion, and/or frequency conversion to provide sonic examples. Further, those skilled in the relevant art(s) will recognize that the antenna 230 may include an integer array of antennas, and that the antenna 230 may be capable of both transmitting and receiving wireless communication signals. For example the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. Here, the transceiver 200 can be referred to as LTE transceiver 200.

The controller 240 includes suitable logic, circuitry, and/or code that is configured to control the overall operation of the base station 120, including the operation of the transceiver 200. The controller 240 can include one or more processors (CPUs) 250 configured to carry out instructions to perform arithmetical, logical, and/or input/output (I/O) operations of the base station 120 and/or one or more components of the base station 120. The controller 240 can further include a memory 260 that includes suitable logic, circuitry, and/or code that is configured to store data and/or instructions. The memory 260 can be any well-known volatile and/or non-volatile memory, including, for example, read-only memory (ROM), random access memory (RAM), flash memory, a magnetic storage media, an optical disc, erasable programmable read only memory (EPROM), programmable read only memory (PROM) and the like. The memory 260 can be non-removable, removable, or a combination of both.

Figure 3:
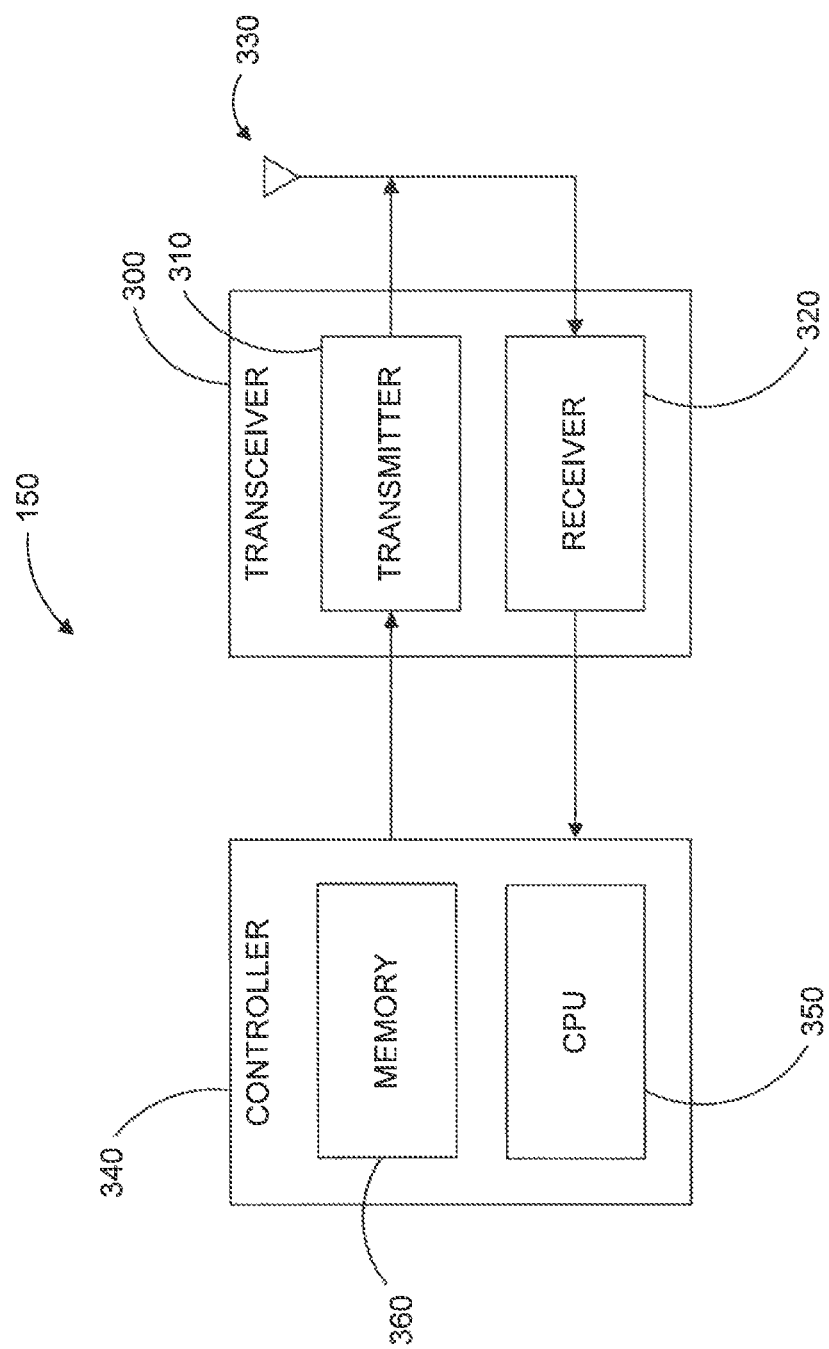
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to a controller 340.

The transceiver 500 is similar to the transceiver 200 and includes suitable circuitry, and/or code that is configured to transmit and/or receive wireless communications via one or more wireless technologies within the communication environment 100. In particular, the transceiver 300 can similarly include a transmitter 310 and a receiver 320 that have suitable logic, circuitry, and/or code configured to transmit and receive wireless communications, respectively, via one or more antennas 330. Those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 Wi-Fi specification. Here, the transceiver 300 can be referred to as Wi-Fi transceiver 300.

The controller 340 is similar to the controller 240 and includes suitable logic, circuitry, and/or code that is configured to control the overall operation of the AP 150, including the operation of the transceiver 300. The controller 340 can include one or more processors (CPUs) 350 configured to carry out instructions to perform arithmetical, logical, and/or input/output (I/O) operations of the AP 150 and/or one or more components of the AP 150. The controller 340 can further include a memory 360 that includes suitable logic, circuitry, and/or code that is configured to store data and/or instructions. The memory 360 can be any well-known volatile and/or non-volatile memory similar to the memory 260 described above. Similarly, the memory 360 can be non-removable, removable, or a combination of both.

Figure 4:
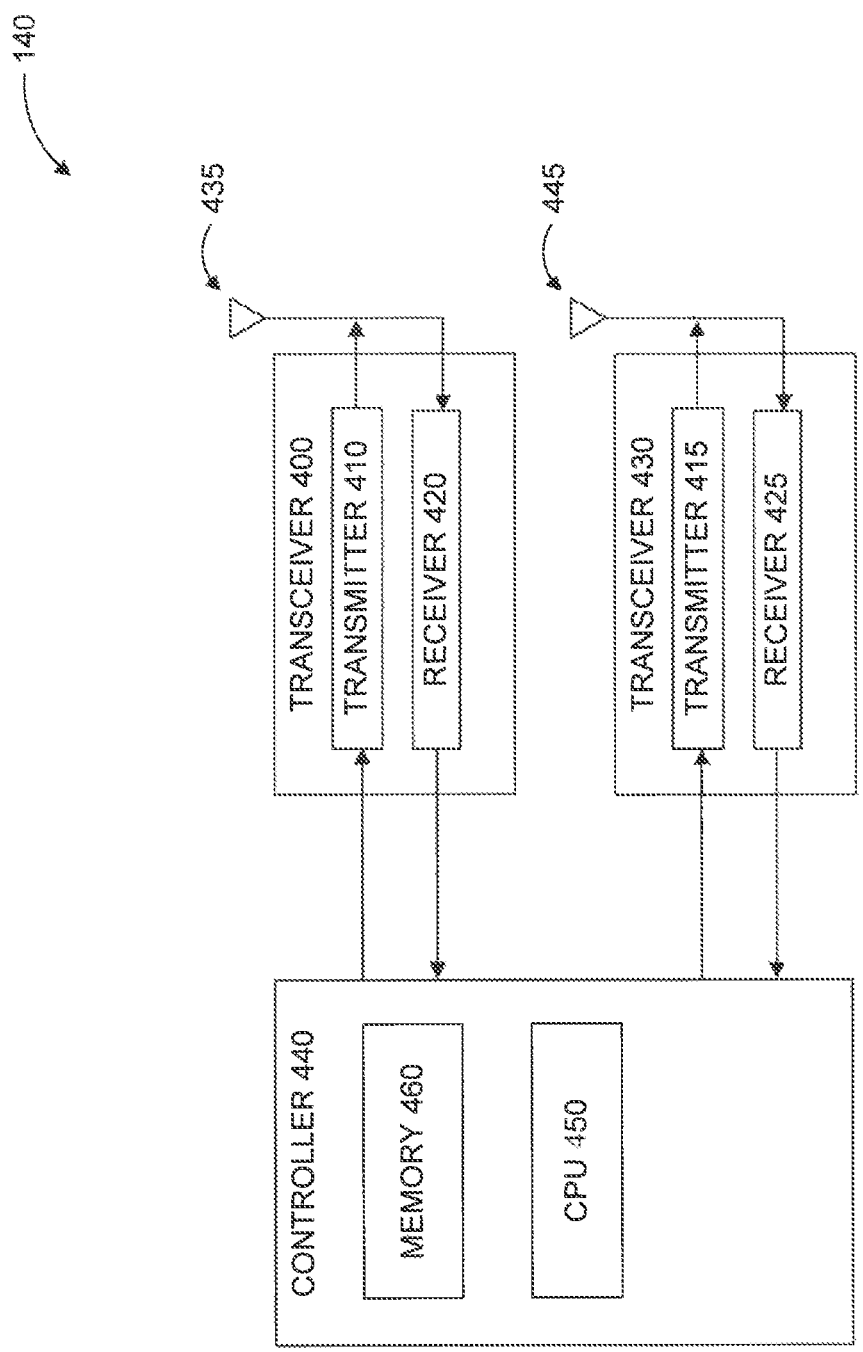
FIG. 4 illustrates a mobile device according to an exemplary embodiment of the present disclosure.

FIG. 4 illustrates the mobile device 140 according to an exemplary embodiment of the present disclosure. The mobile device 140 can include a controller 440 communicatively coupled to an LTE transceiver 400 and a Wi-Fi transceiver 430.

The LTE transceiver 400 includes suitable logic, circuitry, and/or code that is configured for transmitting and/or receiving wireless communications conforming to 3GPP's LTE specification. In particular, the LTE transceiver 400 can include an LIE transmitter 410 and an LTE receiver 420 that have suitable logic; circuitry, and/or code configured for transmitting and receiving wireless communications conforming to 3GPP's LTE specification, respectively, via one or more antennas 435.

The Wi-Fi transceiver 430 includes suitable logic, circuitry, and/or code that is configured for transmitting and/or receiving wireless communications conforming to IEEE's 802.11 Wi-Fi specification. In particular, the Wi-Fi transceiver 430 can include a Wi-Fi transmitter 415 and a Wi-Fi receiver 425 that have suitable logic, circuitry, and/or code configured for transmitting and receiving wireless communications conforming to IEEE's 802.11 Wi-Fi specification, respectively, via one or more antennas 445.

Regarding the LTE transceiver 400 and the Wi-Fi transceiver 430, the processes for transmitting and/or receiving wireless communications can include (but are not limited to) digital signal processing, modulation and/or demodulation of data, DAC and/or ADC conversion, and/or frequency conversion to provide some examples. Further, those skilled in the relevant art(s) will recognize that antennas 435 and/or 445 may include an integer array of antennas, and that the antennas may be capable of both transmitting and receiving wireless communication signals.

The controller 440 includes suitable logic, circuitry, and/ or code that is configured to control the overall operation of the mobile device 140, including the operation of the LTE transceiver 400 and Wi-Fi transceiver 430. The controller 440 can include one or more processors (CPUs) 450 configured to carry out instructions to perform arithmetical, logical, and/or input/output (I/O) operations of the mobile device 140 and/or one or more components of the mobile device 140. The controller 440 can further include a memory 460 that is similar to memories 260 and 360, and includes suitable logic, circuitry, and/or code that is configured to store data and/or instructions. Similarly, the memory 660 can be any well-known volatile and/or non-volatile memory, and can be non-removable, removable, or a combination of both.

In an exemplary embodiment, the controller 440 is configured to offload communications from one of the LTE or Wi-Fi transceivers 400, 430 to the other of the LTE and Wi-Fi transceivers 400, 430. The offloading can be based on one or more offloading policies provided to the mobile device 140 by one or more service providers and received via the LTE transceiver 400 and/or the Wi-Fi transceiver 430. Further, the offloading policies can be stored in the memory 460, and accessed and executed by the CPU 450 to effectuate the offloading of communications. For example, the controller 440 can be configured to control the mobile device 140 to offload communications with the base station 120 to the AP 150 based on one or more of the offloading policies.

In an exemplary embodiment, the mobile device 140 includes one or more other transceivers configured to communicate via one or more well-known communication technologies (e.g., CDMA, GSM, or the like). The one or more other transceivers can also be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples.

In exemplary embodiments of the present disclosure, the communications environment 100 can be configured for inter-system offloading of communications based on one or more offloading policies implemented by the mobile device 140. The offloading of communications with the mobile device 140 can be from the base station 120 to the AP 150, from the AP 150 to the base station 120, or a combination of both. For example, the mobile device 140 can be configured to offload communications with the base station 120 to the AP 150 based on one or more offloading policies provided to the mobile device 140 by one or more service providers. In an exemplary embodiment, the offloading policies are maintained in a policy server that is communicatively coupled to the mobile device 140 via one or more communication networks associated with the one or more service providers.

The offloading policies can be received by the mobile device 140 via the LTE transceiver 400 and/or the Wi-Fi transceiver 430 from the one or more service providers. Further, the offloading policies can be either statically preconfigured on the mobile device 140 or dynamically updated by the service provider and provided to the mobile device 140. The policies can be stored in the memory 460, and accessed and executed by the CPU 450 to effectuate the offloading of communications between the mobile device 140 and base station 120 and/or the AP 150. The offloading policies can include one or more rules associated with the location of one or more communication networks, the location of the mobile device 140, the available communication networks at specified locations, the day of week, the time of day, or the like, as well as discovery information corresponding to the various communication networks.

In operation, the mobile device 140 can compare one or more of the parameters defined in the offloading policy with parameters corresponding to the current environmental (e.g., location, time, etc.) conditions of the mobile device 140. Based on this comparison, the mobile device 140 determines whether to perform an offloading operation to another communication network. For example, if the offloading policy defines a parameter associated with a specific location, and the mobile device's 140 current location matches the specific location defined in the offloading policy, the mobile device 140 is allowed to offload communications to the other communication network.

In an exemplary embodiment, the one or more offloading policies conform to the Access Network Discovery and Selection Function (ANDSF) framework defined in the 3GPP TS 24.312 specification, which is incorporated herein by reference in its entirety. The ANDSF framework is an entity introduced by 3GPP as part of the Release 8 set of specifications, within an Evolved Packet Core (EPC) of the System Architecture Evolution (SAE) for 3GPP compliant communication networks. The ANDSF framework assists the mobile device 140 to discover one or more non-3GPP communication networks (e.g., Wi-Fi, WIMAX, etc.) that can be used for data communications in addition to one or more 3GPP communication networks (e.g., LTE, HSPA, etc.) and to provide the mobile device 140 with rules (e.g., policy conditions) that control the connection to these non-3GPP communication networks.

The ANDSF framework is defined by one or more ANDSF Management Objects (MO) that are generated by the service providers of the one or more 3GPP communication networks and provided to the mobile device 140. The ANDSF MOs of the framework can provide the mobile device 140 with the following information, based on the service provider's configuration:
1. Inter-System Mobility Policy (ISMP)—network selections rules for a mobile device with no more than one active communication network connection (e.g., either LTE or Wi-Fi).
2. Inter-System Routing Policy (ISRP)—network selection rules for the mobile device with potentially more than one active communication network connection (e.g., both LTE and Wi-Fi). Here, the mobile device may employ IP Flow Mobility (IFOM), Multiple Access Packet Data Networks (PDN) Connectivity (MAPCON) or non-seamless Wi-Fi offloading according to operator policy and user preferences.
3. Discovery Information—a list of networks that may be available in the vicinity of the mobile device and information assisting the mobile device to expedite the connection to these networks.

Here, the ANDSF framework assists the mobile device 140 to discover communication networks in the vicinity of the mobile device 140 and prioritize/manage connections to the communication networks. The policies set forth in the ANDSF framework can be statically pre-configured on the mobile device or dynamically updated by the service provider and provided to the mobile device 140 via the Open Mobile Alliance (OMA) Device Management (DM) protocol specified by the OMA DM Working Group and the Data Synchronization (DS) Working Group. The OMA DM protocol is incorporated herein by reference in its entirety.

The ANDSF Management Objects (MO) include various rules/conditions and information organized into one or more "nodes" each having one or more "leaf objects." The nodes and leaf objects define the various rules and discovery information that are used by the mobile device 140 in governing the ISMP, ISRP, and Discovery processing by the mobile device 140. For example, the ANDSF MO is used by the mobile device 140 to establish communications via one or more non-3GPP communication networks (e.g., Wi-Fi communication network on AP 150) and effectuate offloading of the mobile device's 140 communications via the base station 120 to, for example, the AP 150.

The ANDSF MOs can be maintained by an ANDSF server that is communicatively coupled to the mobile device 140 via one or more communication networks associated with the one or more service providers (e.g., via the base station 120). The various rules and information within the ANDSF MO can be either statically pre-configured on the mobile device 140 or dynamically updated by the service provider and provided to the mobile device 140. The ANDSF MO can be stored in the memory 460 of the mobile device 140, and accessed and executed by the CPU 450 to effectuate the offloading of communications between the mobile device 140 and base station 120 and/or the AP 150.

Figure 5:
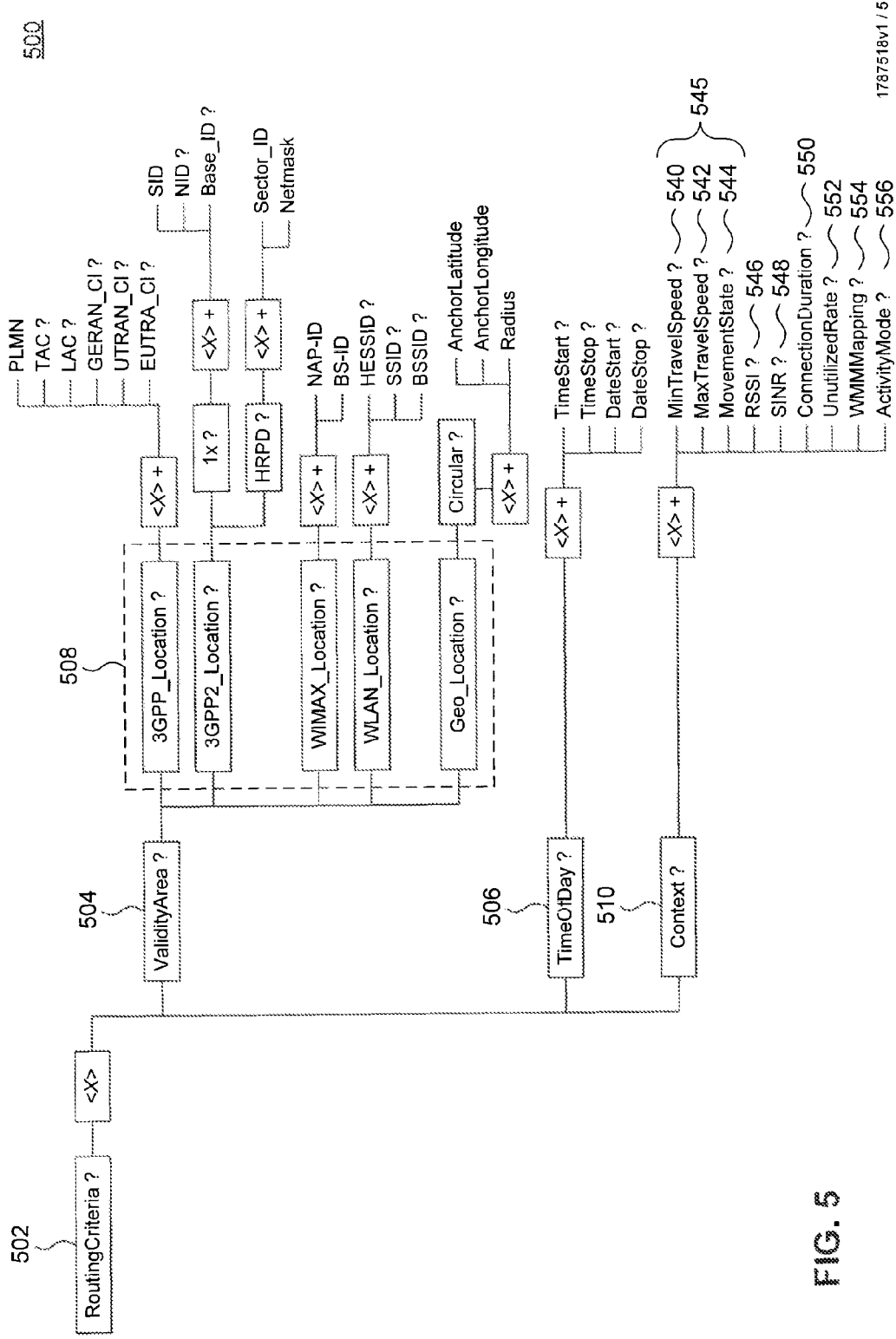
FIG. 5 illustrates a management framework according to an exemplary embodiment of the present disclosure.

In operation, with reference to FIG. 5, when a condition within the ANDSF MO becomes "active" (e.g., the mobile device 140 moves within range of a communication network serving cell that is specified in a node/leaf of the of the ANDSF MO), the mobile device 140 notifies the event to the ANDSF server and requests the Inter-system Discovery Information based on the preferred access technology recommended in the MO (e.g., Wi-Fi). The ANDSF server will provide the mobile device 140 with the communication network's identification information (e.g., Wi-Fi Hotspot SSIDs) in the vicinity and related access information (e.g., Wi-Fi security keys). The mobile device 140 uses this information to connect to the other communication network. Further, the mobile device 140 can offload communications originally destined for the original serving communication network (e.g., LTE) to the other communication network based on rules set forth in the ANDSF MO.

FIG. 5 illustrates an example ANDSF Management Object (MO) 500 according to exemplary embodiments of the present disclosure. The ANDSF MO 500 can be implemented by the mobile device 140, base station 120 and/or AP 150 as described herein.

The ANDSF MO 500 provides an offloading framework that includes various rules/conditions and information organized into one or more "nodes," where each node may have one or more "leaf objects." The nodes are organized into a hierarchy with one or more nodes having one or more decedent nodes. It should also be appreciated that the one or more nodes may not have any decedent nodes. The last node in a hierarchal branch can include one or more leaf objects that define a rule and/or contain information associated with a corresponding communication network. For example, the nodes and leaf objects define the various rules and discovery information that are used by the mobile device 140 in governing the ISMP, ISRP, and Discovery processing by the mobile device 140.

In an exemplary embodiment, the ANDSF MO 500 includes one or more nodes and/or leaf objects having portions of which that are defined in the 3GPP TS 24.312 specification. For example, the ANDSF MO 500 includes RoutingCriteria node 502, which includes the following decedent nodes: ValidityArea 504 and TimeOfDay 506 that are previously defined in the 3GPP TS 24.312 specification. Other nodes, including the context node 510, are not currently defined in the 3GPP specification and are added herein according to exemplary embodiments of the disclosure.

The RoutingCriteria node 502 is a placeholder for validity conditions for one or more flow distribution rules. The ValidityArea node 504 is a placeholder for location conditions for one or more flow distribution rules. The ValidityArea node 504 can include one or more decedent nodes, including (but not limited to): 3GPP_Location, 3GPP2_Location, WiMAX_Location, WLAN_Location, and Geo_Location. For the purposes of this discussion, the decedent nodes of the ValidityArea node 504 can collectively be referred to as "location nodes" 508. Each of the various nodes within the location nodes 508 can further include one or more leaf objects, or one or more decedent nodes having one or more leaf object descending therefrom. For example, the WLAN_Location node can include leaf objects HESSID (homogenous extended service set identifier), BSSID (basic service set identifier), and SSID (service set identifier). The HESSID is a media access control (MAC) address that is the same on all access points belonging to a particular network. Similarly, the BSSID and SSID are identifiers used to identify the basic service set (e.g., an access point and one or more stations). For example, BSSID uniquely identifies the basic service set (BSS) and is a MAC address of the wireless access point generated by combining the 24 bit Organization Unique Identifier (e.g., the manufacturer's identity) and the manufacturer's assigned 24-bit identifier for the radio chipset in the access point. The SSID is 1 to 32 byte string and is typically a human-readable string commonly called the "network name." The HESSID, BSSID and SSID are further defined in the IEEE 802.11 standard, which is incorporated herein in its entity.

The TimeOfDay node 506 indicates the time of day condition. The time of day condition is considered valid ("active") if the time of day in the current time zone, as indicated by the mobile device 140, matches at least one time interval indicated in the TimeOfDay node 510. That is, the time of day satisfies one or more of the leaf objects of the TimeOfDay node 506.

In operation, the mobile device 140 is configured to offload communications originally destined for the original serving communication network (e.g., LTE) to the other communication network based the state of one or more of the rules defined by their corresponding nodes. That is, the mobile device 140 can establish a connection with, and offload communications to, a Wi-Fi communication network associated with a Wi-Fi access point (e.g., AP 150) based on the active states of one or more of the nodes set forth in the ANDSF MO 500. For example, if the mobile device 140 is within range of the AP 150 and the SSID associated with AP 150 matches the SSID defined in the ANDSF MO 500 (i.e., the WLAN_Location node (location nodes 508) is active), and the current time reported by the mobile device 140 is between the time set forth in the TimeStart leaf and the TimeStop leaf of the TimeOfDay node 506 (i.e., the TimeOfDay node 506 is active), the mobile device 140 executes an offloading process to offload LTE communications established with the base station 120 to the AP 150 as Wi-Fi communications.

In an exemplary embodiment, in addition to ValidityArea 504 and TimeOfDay 506, the ANDSF MO 500 also includes a context node 510 including contextual information for network selection and offloading that is not currently defined in 3GPP TS specification. The context node 510 can include one or more leaf objects defining validity conditions associated with, for example, the movement of the mobile device 140, signal information of the other (prospective) communication network (e.g., Wi-Fi network of the AP 150), connection information of the other communication network, data rate information of the other communication network, quality of service (QoS) information of the other communication network, and/or activity information of the current serving communication network (e.g., LTE network of base station 120).

Accordingly, the context node 510 can include (but is not limited to) one or more of the following leaf objects:
MinTravelSpeed 540,
MaxTravelSpeed 542,
MovementState 544,
ReceiverSignalStrength (RSSI) 546,
SignalToInterferencePlusNoiseRatio (SINR) 548,
ConnectionDuration 550,
UnutilizedRate 552,
WMMMapping 554, and/or
ActivityMode 556

The MinTravelSpeed leaf 540, MaxTravelSpeed 542, and MovementState 544 define validity conditions associated with the speed and movement of the mobile device 140. In particular, the MinTravelSpeed leaf 540 defines the minimum travel speed (km/h) of the mobile device 140. Similarly, the MaxTravelSpeed 542 leaf defines the maximum travel speed (km/h) of the mobile device 140.

The MinTravelSpeed leaf 540 is considered active if the estimated travel speed of the mobile device 140 exceeds the minimum speed value defined by the MinTravelSpeed leaf 540. Similarly, the MaxTravelSpeed leaf 542 is considered active if the estimated travel speed of the mobile device 140 is less than the maximum speed value defined by the MaxTravelSpeed leaf 542. Here, the mobile device 140 can be configured to estimate its movement speed using an accelerometer included in the mobile device 140, GPS information and/or any other geo-location techniques to provide some examples.

The MovementState leaf 544 defines one or more movement states of the mobile device 140. For example, the movement states can include; stationary, pedestrian (e.g., PA3 or PB3), vehicular (e.g., VA30), nigh-speed rail, aviation, or any other movement states defined by 3GPP, or as would understood by those skilled in the relevant art(s). The pedestrian states PA3 and PB3 refer to the Pedestrian-. (3 km/h) and Pedestrian-B (3 km/h) movement states, respectively, as defined by 3GPP. Similarly, the vehicular state VA30 refers to the Vehicular-A (30 km/h) movement state as defined by 3GPP. The MovementState leaf 544 is considered active if the mobile device 140 determines, based on the estimated movement speed of the mobile device 140, that the mobile device 140 satisfies one of the various movement states defined in the MovementState leaf 544.

For the purpose of this discussion, the MinTravel Speed leaf 540, MaxTravelSpeed leaf 542, and MovementState leaf 544 can be collectively referred to as the device movement leaves 545.

The RSSI leaf 546 and the SINR leaf 548 define validity conditions associated with signal strength and quality information of the other communication network (e.g., Wi-Fi network of the AP 150). The RSSI leaf 546 and the SINR leaf 548 define received signal strength indication (RSSI) and signal-to-interference-plus-noise ratio (SINR) thresholds (dB); respectively, for the wireless connection between the mobile device 140 and the other (prospective) communication network. The RSSI leaf 546 and SINR leaf 548 are considered active if the RSSI and the SINR of the connection is above the dB levels set forth in the respective RSSI and SINR leaves 546, 548. Here, the RSSI and SINR leaves 546, 548 collectively serve as a secondary threshold for the wireless connection. That is, the mobile device 140 may have a minimum RSSI and/or SINR threshold value (i.e., a "connection threshold") used for determining if a wireless connection can be established, according to the device hardware specifications. The thresholds defined in the RSSI and SINR leaves 546, 548 can then serve as threshold values that exceed the minimum (device) threshold and thereby ensure a higher quality connection than one that may be formed if only the connection threshold is satisfied.

The ConnectionDuration leaf 550 defines validity conditions associated with connection information for the other communication network (e.g., Wi-Fi network of the AP 150). In particular, the ConnectionDuration leaf 550 defines the duration in which the mobile device 140 and/or one or more other mobile devices have previously remained connected to the other communication network. The mobile device 140 can be configured to estimate the stability of the connection using the durations of one or more previously established connections to the other communication network, For example, multiple, short connection durations by the mobile device 140 (or other mobile devices) may evidence a wireless connection that repeatedly becomes available and unavailable due to an access point that is subject to, for example, shadowing, slow fading, or any other condition resulting in instability in the connection.

In an exemplary embodiment, the mobile device 140 can be configured to estimate the stability of the connection utilizing a Poisson probability distribution with a fixed but unknown lambda. Here, the longer connection duration results in a lower estimated lambda, which results in a longer expected duration until the next disconnection. A longer expected duration may evidence a more stable connection.

The UnutilizedRate leaf 552 defines validity conditions associated with data rate information and/or channel utilization information of the other communication network (e.g., Wi-Fi network of the AP 150). Here, a "data rate validity condition" can be used to refer to the data rate information, the channel utilization information, or a combination of both. In particular, the UnutilizedRate leaf 552 defines an estimated data rate available to the mobile device 140 on, for example, the Wi-Fi network of the AP 150, and an estimated Wi-Fi channel utilization on the network. The data rate can include the estimated maximum bit rate (MBR) and/or guaranteed bit rate (GBR).

The AP 150 can be configured to estimate the data rate on the Wi-Fi network (i.e., via the wireless medium) and the channel utilization using any well-known date rate and/or channel utilization estimation processes that would be understood by those skilled in the relevant art(s), including, for example, estimations based on the "average cycle time" approach discussed in "Throughput Analysis of IEEE 802.11 Wireless LANs using Average Cycle Time Approach," K. Medepalli and F. A. Tobagi, Proceedings of IEEE Globecom 2005, and discussed in U.S. patent application Ser. No. 14/149,390, filed Jan. 7, 2014, entitled "Mobile Device With Cellular-WLAN Offload Using Passive Load Sensing Of WLAN," each of which is incorporated herein by reference in its entirety.

In operation, the AP 150 can, for example, analyze the current GBR and/or MBR for ongoing services of the AP 150. Here, the ongoing services of the AP 150 refers to one or more active connections to the AP 150 and the respective data rates of these connections. The AP 150 can then compare the value(s) for ongoing services with an estimation of GBR and/or MBR of the AP 150 that includes a prospective connection of the mobile device 140 to determine if the AP 150 can provide reliable offloading to the mobile device 140. For example, the AP 150 can determine that the AP 150 can provide reliable offloading when the estimated GBR is equal to or greater than the total GBR for ongoing services (e.g., ongoing GBR bearers), and the estimated MBR is equal to or greater than a predetermined percentage of the total MBR for ongoing services (e.g., ongoing MBR bearers). That is, the AP 150 can determine that the AP 150 can provide reliable offloading if the following equations are satisfied:

$$GBR_{estimate} \geq GBR_{ongoing}$$

$$MBR_{estimate} \geq MBR_{ongoing} \times \beta$$

Where $GBR_{estimate}$ is the estimated GBR, $GBR_{ongoing}$ is the total GBR for ongoing services, $MBR_{estimate}$ is the estimated MBR, $MBR_{ongoing}$ is the total MBR for ongoing services, and $\beta$ is a predetermine value such that $0<\beta\leq1$.

In an exemplary embodiment, the AP 150 can be provided with bandwidth information for the backhaul connection supporting the AP 150. The backhaul bandwidth information can be provided from, for example, the service provider supporting the AP 150. Here, the UnutilizedRate leaf 552 can then include the backhaul bandwidth information so that an overall bandwidth estimation can be calculated using the backhaul and wireless medium estimations.

In exemplary embodiment, the AP 150 is configured to be Hotspot 2.0 compliant, as defined in the IEEE 802.11u standard. In this embodiment, the AP 150 can provide the mobile device 140 with BSS load information and/or WLAN Metrics Access Network Query Protocol (ANQP) information. The BSS load information and WLAN Metrics ANQP information can be utilized by the mobile device 140 to determine date rates and the reliability of offloading communications to the AP 150.

The WMMMapping leaf 554 defines validity conditions associated with quality of service (QoS) information of the other communication network. In particular, the WMMMapping leaf 554 defines Wi-Fi multimedia (WMM) mapping to provide, for example, packet priority information, packet error loss rate information and/or packet delay budget information. In an exemplary embodiment, the WMM mapping (and the various provided information) is similar to the QoS Class Identifier (QCI) mapping defined in the 3GPP specification. Using the information defined in the WMMMapping leaf 554, the mobile device 140 can determine whether the Wi-Fi network will provide the same or better QoS as the LTE network, which typically provides low latency for Real-time Transport Protocol (RTP) traffic (e.g., voice and/or video traffic).

The ActivityMode leaf 556 defines validity conditions associated with activity information of the current serving communication network (e.g., LTE network of base station 120). In particular, the ActivityMode leaf 556 is valid ("active") when there is an active data flow (UL and/or DL) on the current serving network (e.g., LTE network). Using this information, the mobile device 140 can improve the current experience on the LTE network by reducing loss of packets due to a handoff to another communication network during an active data flow on the current network. That is, offloading during a current data flow may impact the application usability and performance of the mobile device 140. For example, if the condition of ActivityMode leaf 556 is valid (i.e., there is an active data flow), the mobile device 140 may determine that is it not an appropriate time to offload communications.

In an exemplary embodiment, the mobile device 140 is configured to offload communications originally destined for the original serving communication network (e.g., LTE) to another communication network (e.g., Wi-Fi) based the state of one or more of nodes defined in the ANDSF MO 500. For example, the mobile device 140 can utilize the location information associated with the ValidityArea node, and particularly, with the location nodes 508, to determine whether the mobile device 140 is within range of the other (prospective) communication network in which potential offloading can be performed. Further, the mobile device 140 can utilize one or more of the leaf objects 540 to 556 of the context node 510 in addition to the location information to determine whether to offload to the Wi-Fi communication network from the LTE network. For example, if the mobile device 140, utilizing one or more of the location nodes 508, determines that the mobile device 140 is within range of the AP 150, the mobile device 140 can determine if the traveling speed of the mobile device 140 is conducive for offloading (e.g., the mobile device 140 is not moving too fast through the Wi-Fi network coverage area) utilizing one or more of the leafs: MinTravelSpeed 540, MaxTravelSpeed 542, and MovementState 544. If the mobile device 140 determines that its speed is conducive for offloading, the mobile device

140 may then utilize signal, connection, date rate, QoS, and/or connection activity information (e.g., one or more leaves 546 to 556) to determine if the AP 150 provides a suitable environment for offloading communications.

Figure 6:
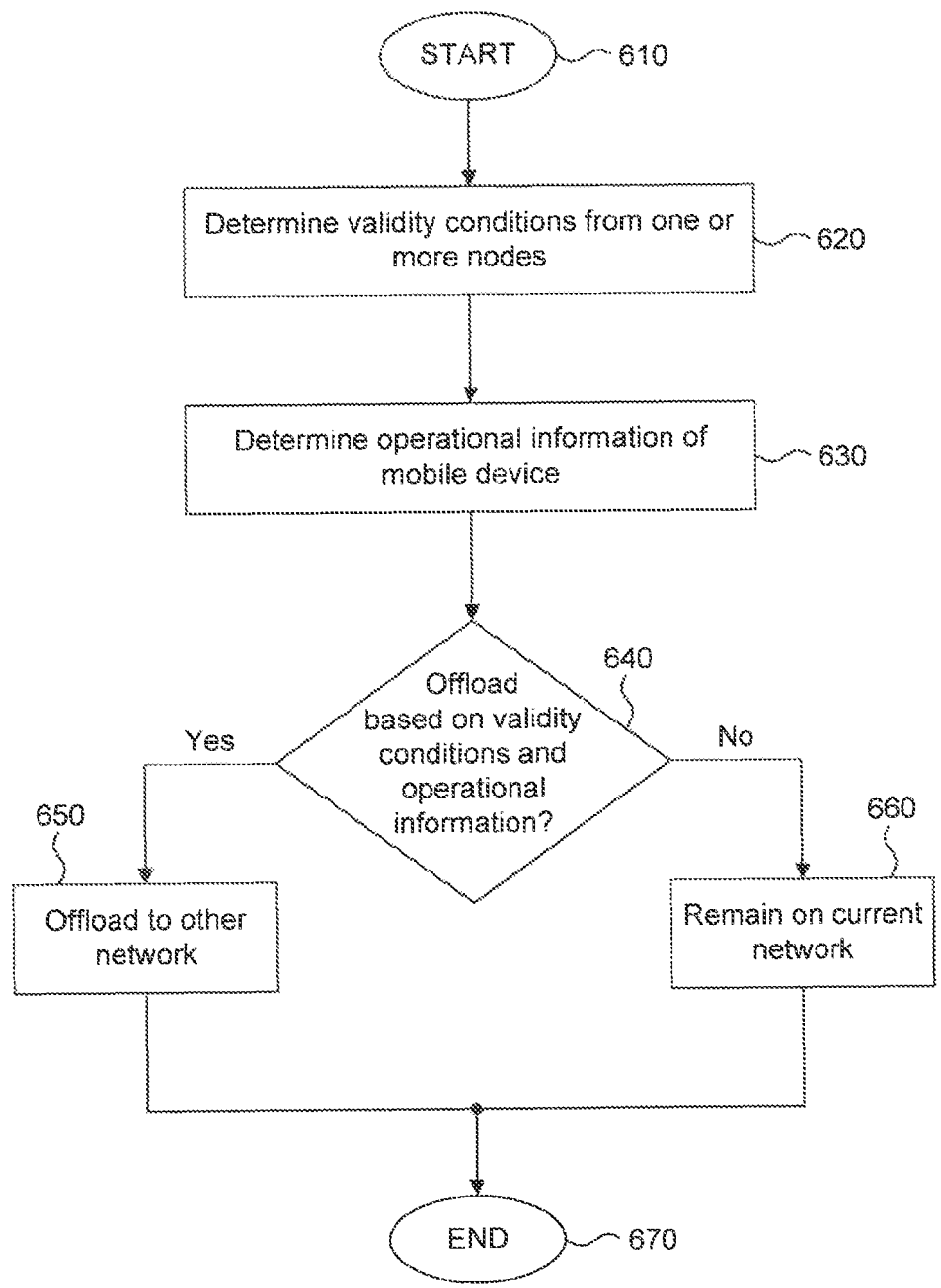

FIG. 6 illustrates a flowchart 600 of an offloading method in accordance with an exemplary embodiment of the present disclosure. The method of flowchart 600 is described with continued reference to FIGS. 1-5. The steps of the method of flowchart 600 are not limited to the order described below, and the various steps may be performed in a different order. Further, two or more steps of the method of flowchart 600 may be performed simultaneously with each other.

The method of flowchart 600 begins at step 610 and transitions to step 620, where the mobile device 140 determines one or more validity conditions corresponding to one or more nodes of the ANDSF MO 500. For example, the mobile device 140 determines one or more communication parameters (e.g., validity conditions) of one or more nodes of the ANDSF MO 500. In an exemplary embodiment, the mobile device 140 is configured to receive the ANDSF MO 500 (that includes one or more communication parameters) from an ANDSF server via the LTE network of the base station 120.

After step 620, the flowchart 600 transitions to step 630, where the mobile device 140 determines operational information (e.g., location, movement, current network, network characteristics, etc.) of the mobile device 140. For example, the mobile device 140 can be configured to determine: location and/or movement of the mobile device 140 using one or more positional sensors (e.g., GPS, accelerometer, etc.), current network information (including network signal strength, QoS, etc.), and/or any other environmental information affecting the mobile device 140.

After step 630, the flowchart 600 transitions to step 640, where the mobile device 140 determines whether to offload communications from a current serving network (e.g., LTE) to another communication network (e.g., Wi-Fi) utilizing the determined nodal information from step 620 and the current operational information from step 630. That is, the mobile device 140 can be configured to compare the current operational information to nodal information, and/or to compare detected information for the other communication network to the nodal information, to determine whether to effectuate an offloading of communications to the other communication network. For example, the mobile device 140 can compare the current movement information of the mobile device 140 to the validity conditions defined in the device movement leaves 545 to determine whether the mobile device 140 is traveling at a speed conducive for offloading (e.g., the mobile device 140 is moving slowly or is stationary). Similarly, the mobile device 140 can be configured to detect signal information from the Wi-Fi network and compare it to the validity conditions of the RSSI leaf 546 and/or SNR leaf 548. If the current signal information meets or exceeds the thresholds set forth in the RSSI leaf 546 and/or SINR leaf 548, the mobile device 140 can determine that the signal quality is conducive for offloading.

If the mobile device 140 determines that communications should he offloaded to the other communication network (YES at step 640), the flowchart 600 transitions to step 650, where the communications from the current serving network (e.g., LTE) are offloaded to the other communication network (e.g., Wi-Fi).

If the mobile device 140 determines that communications should not be offloaded to the other communication network (NO at step 640), the flowchart 600 transitions to step 660, where the communications from the current serving network (e.g., LTE) are not offloaded to the other communication network (e.g., Wi-Fi) and remain on the current serving network.

After steps 650 and 660, the flowchart 600 transitions to step 670, where the flowchart 600 ends. Here, the flowchart 600 may return to step 610 to repeat the offloading method.

FIG. 7 illustrates a flowchart 600 of an offloading method in accordance with an exemplary embodiment of the present disclosure. The method of flowchart 700 is described with continued reference to FIGS. 1-6. The steps of the method of flowchart 700 are not limited to the order described below, and the various steps may he performed in a different order. Further, two or more steps of the method of flowchart 400 may be performed simultaneously with each other.

The method of flowchart 700 begins at step 705 and transitions to step 710, where the mobile device 140 determines whether one or more other (prospective) communication networks (e.g., AP 150) is within range of the mobile device 150. In particular, the mobile device 140 can be configured to determine positional information (e.g., location, movement, etc.) of the mobile device 140 using one or more positional sensors (e.g., OPS, accelerometer, etc.) and/or one or more positional determinations using signal characteristics relative to one or more base stations and/or access points. The mobile device 140 is then configured to determine if one or more other communication networks is within range by comparing the positional information to one or more validity conditions of the ValidityArea node 504. For example, the mobile device 140 can compare the positional information to one or more of the location nodes 508.

If the mobile device 140 determines that one or more other communication networks is within range of the mobile device 140 (YES at step 710), the flowchart 700 transitions to step 715. Otherwise, the flowchart 700 returns to step 710.

At step 715, the mobile device 140 determines whether the mobile device 140 is in motion. In particular, the mobile device 140 can be configured to determine movement information (e.g., speed, acceleration, etc.) of the mobile device 140 using one or more positional and/or movement sensors (e.g., GPS, accelerometer, gyroscope sensor, etc.) and/or one or more positional determinations using signal characteristics relative to one or more base stations and/or access points. If the mobile device 140 determines that the mobile device 140 is in motion (YES at step 715), the flowchart 700 transitions to step 720. Otherwise (NO at step 715), the flowchart 700 transitions to step 730.

At step 720, the mobile device 140 compares the determined movement information from step 715 to one or more validity conditions of one or more of the device movement leaves 545 to determine the movement state of the mobile device 140. For example, the mobile device 140 determines the movement state of the mobile device 140 based on the movement states defined in the MovementState leaf 544 to determine if the mobile device 140 is traveling at a pedestrian speed, a vehicular speed, or the like.

If the mobile device 140 determines that mobile device 140 is traveling at a pedestrian speed or lower (YES at step 720), the flowchart 700 transitions to step 730. Otherwise (NO at step 720), the flowchart 700 transitions to step 725.

At step 755, the mobile device 140 determines whether the other communication network determined in step 710 is an extended communication networks (e.g., Municipal wireless networks, campus-wide networks, or the like). In particular, the mobile device 140 can compare identification information associated with the other communication network with one or more validity conditions of the ValidityArea node 504. For example, the mobile device 140 can compare the identification information to one or more validity conditions of the location nodes 508.

If the mobile device 140 determines that the other communication network is an extended network (YES at step 725), the flowchart transitions to step 730. Otherwise (NO at step 725), the flowchart transitions to step 760, where the mobile device 140 determines not to offload communications to the other communication network. Here, because of the likelihood that the mobile device 140 will not remain within range of the other communication network for a sufficient period of time, the mobile device 140 decides not to offload to the other communication network.

At step 730, the mobile device 140 determines whether the signal quality on the other communication network is conducive for the offloading of communication from the current serving network. For example, the mobile device 140 can be configured to analyze the signal quality (e.g., signal strength, noise, etc.) by comparing one or more validity conditions of the RSSI leaf 546 and/or SINR leaf 548 to signal quality information of the other communication network that is detected by the mobile device 140. Here, the mobile device 140 can determine that the signal quality on the other communication network is conducive for the offloading of communications if for example, the detected RSSI and/or SINR of the other communication network matches or exceeds the corresponding RSSI and SINR thresholds set forth in the RSSI leaf 546 and SINR leaf 548, respectively.

If the mobile device 40 determines that the signal quality is sufficient for offloading (YES at step 730), the flowchart transitions to step 735. Otherwise (NO at step 730), the flowchart transitions to step 760, where the mobile device 140 determines not to offload communications to the other communication network.

At step 735, the mobile device 140 determines whether the data rate of the other communication network is conducive for the offloading of communication from the current serving network. For example, the mobile device 140 can be configured to receive data rate estimations from the AP 150 of the other communication network. Here, the AP 150 can be configure to estimate the data rate on the Wi-Fi network (i.e., via the wireless medium) and the channel utilization of the network. The mobile device 140 can be configured to then compare the estimated data rate and/or channel utilization information to the data rate and channel utilization information set forth in the UnutilizedRate leaf 552. Here, the mobile device 140 can determine that the date rate and/or channel utilization of the other communication network is conducive for the offloading of communications if, for example, the estimated data rate and channel utilization information matches or exceeds the corresponding data rate and/or channel utilization information (e.g. thresholds) set forth in the UnutilizedRate leaf 552.

If the mobile device 140 determines that the estimated data rate and channel utilization information is sufficient for offloading (YES at step 735), the flowchart transitions to step 740. Otherwise (NO at step 740), the flowchart transitions to step 760, where the mobile device 140 determines not to offload communications to the other communication network.

At step 740, the mobile device 140 determines whether the connection duration information of the other communication network is conducive for the offloading of communication from the current serving network. For example, the mobile device 140 can be configured to determine one or more durations in which one or more mobile devices have previously remained connected to the other communication network by obtaining the connection duration information as defined in the ConnectionDuration leaf 550. Here, the mobile device 140 can be configured to estimate the stability of the connection using durations of one or more previously established connections to the other communication network. The mobile device 140 can determine that the connection is stable if, for example, the connection duration(s) matches or exceeds the corresponding connection duration information (e.g. threshold) defined in the ConnectionDuration leaf 550.

If the mobile device 140 determines that the connection stability is sufficient for offloading (YES at step 740), the flowchart transitions to step 745. Otherwise (NO at step 740), the flowchart transitions to step 760, where the mobile device 140 determines not to offload communications to the other communication network.

At step 745, the mobile device 140 determines whether the quality of service (QoS) of the other communication network is conducive for the offloading of communication from the current serving network. For example, the mobile device 140 can be configured to determine WMM mapping information (e.g., packet priority information, packet error loss rate information and/or packet delay budget information) by obtaining the WMM mapping information as defined in the WMMMapping leaf 554. Here, the mobile device 140 can be configured to determine that the QoS of the other communication network is conducive for the offloading of communications if, for example, the WMM mapping information of the other communication network matches or exceeds the WMM mapping information (e.g. thresholds) defined in the WMMMapping leaf 554.

If the mobile device 140 determines that the QoS of the other communication network is sufficient for offloading (YES at step 745), the flowchart transitions to step 750. Otherwise (NO at step 745), the flowchart transitions to step 760, where the mobile device 140 determines not to offload communications to the other communication network.

At step 750, the mobile device 140 determines data flow status of the mobile device 140 and the current serving network. That is, the mobile device 140 determines if there is an active data flow (UL and/or DL) on the current serving network. For example, if the condition of ActivityMode leaf 556 is valid (i.e., there is an active data flow), the mobile device 140 may determine that is it not an appropriate time to offload communications.

If the mobile device 140 determines that there is an active data flow on the current serving network, (YES at step 750), the flowchart transitions to step 760, where the mobile device 140 determines not to offload communications to the other communication network. Otherwise (NO at step 750), the flowchart transitions to step 755. After step 760, the flowchart transitions to step 775, where the flowchart ends. The flowchart 700 may return to step 705 to repeat the offloading method.

At step 755, the mobile device 140 determines to offload communications to the other communication network. After step 755, the flowchart 700 transitions to step 765.

At step 765, the mobile device 140 is configured to determine whether to return to the previous communication network. That is, the mobile device 140 determines whether to return to the LTE network from which communications were previously offloaded from. Here, the mobile device 140 may determine to return to the LTE network if one or more of the validity conditions set forth in the ANDSF MO 500 are no longer valid. For example, if the mobile device 140 begins to move at a speed above the threshold defined in the device movement leaves 545, the signal strength drops below the thresholds defined in the RSSI leaf 546, the data rate drops below the threshold defined in the UnutilizedRate leaf 552, or the like.

If the mobile device 140 determines that the mobile device 140 should return to the previous network (YES at step 765), the flowchart transitions to step 770, where the mobile device 140 returns to the LTE network. Otherwise (NO at step 765), the flowchart returns to step 765. After step 770, the flowchart transitions to step 775, where the flowchart ends. The flowchart 700 may return to step 705 to repeat the offloading method.

The steps in flowcharts 600 and 700 can be performed by controller 340, for example, based on information received from the various networks.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and nm of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a first transceiver configured to communicate with a first communication network;
a second transceiver configured to communicate with a second communication network; and
a controller configured to:
receive an offloading framework via the first communication network; and
offload communications from the first communication network to the second communication network based on one or more communication parameters defined in the offloading framework,
wherein the one or more communication parameters include a parameter that indicates a data rate validity condition for the second communication network, wherein the data rate validity condition defines a comparison of a data rate of an active connection of a second communication device on the second communication network with an estimated data rate of a prospective connection of the communication device on the second communication network.

2. The communication device of claim 1, wherein the offloading framework conforms to an Access Network Discovery and Selection Function (ANDSF) framework.

3. The communication device of claim 1, wherein the one or more communication parameters further include a parameter that indicates a movement state of the communication device.

4. The communication device of claim 3, wherein the movement state includes at least one of: a Pedestrian-A movement state, a Pedestrian-B movement state, and a Vehicular-A movement state.

5. The communication device of claim 1, wherein the one or more communication parameters further include a parameter that indicates a received signal strength indication (RSSI) threshold or a signal-to-interference-plus-noise ratio (SINR) threshold for the second communication network.

6. The communication device of claim 1, wherein the controller is configured to compare the data rate to the estimated data rate, and offload the communications from the first communication network to the second communication network based on the comparison.

7. The communication device of claim 6, wherein the estimated data rate is estimated by an access point supporting the second communication network.

8. The communication device of claim 1, wherein the one or more communication parameters further include a parameter that defines Wi-Fi multimedia (WMM) mapping to provide quality of service (QOS) of the second communication network, and wherein the controller is further configured to offload the communications based on a comparison of the WMM mapping with QoS mapping of the first communication network.

9. The communication device of claim 8, wherein the WMM mapping includes at least one of packet priority information, packet error loss rate information or packet delay budget information.

10. The communication device of claim 1, wherein the first communication network is a Long-Term Evolution (LTE) communication network and the second communication network is a Wi-Fi communication network.

11. The communication device of claim 1, wherein the one or more communication parameters further include a parameter that indicates a time duration that the communication device or another communication device has previously remained connected to the second communication network.

12. The communication device of claim 1, wherein the one or more communication parameters further include a parameter that indicates whether an active data flow is occurring on the first communication network.

13. A communication method, comprising:
receiving an offloading framework via a first communication network, the offloading framework defining one or more communication parameters;
determining operational information of a communication device configured to operate in the first communication network; and
offloading communications from the first communication network to a second communication network based on a comparison of the operational information and the one or more communication parameters of the offloading framework,
wherein the one or more communication parameters include a parameter that indicates a data rate validity condition of the second communication network, wherein the data rate validity condition defines a comparison of a data rate of an active connection of a second communication device on the second communication network with an estimated data rate of a prospective connection of the communication device on the second communication network.

14. The communication method of claim 13, wherein the offloading framework conforms to an Access Network Discovery and Selection Function (ANDSF) framework.

15. The communication method of claim 13, wherein the one or more communication parameters further include a parameter that indicates a movement state of the communication device.

16. The communication method of claim 13, wherein the one or more communication parameters further include a parameter that indicates a received signal strength indication (RSSI) threshold or a signal-to-interference-plus-noise ratio (SINR) threshold of the second communication network.

17. The communication method of claim 13, wherein the first communication network is a Long-Term Evolution (LTE) communication network and the second communication network is a Wi-Fi communication network.

18. The communication method of claim 13, wherein the one or more communication parameters further include a parameter that indicates a time duration that the communication device or another communication device has previously remained connected to the second communication network.

19. The communication method of claim 13, wherein the one or more communication parameters further include a parameter that indicates whether an active data flow is occurring on the first communication network.

20. The communication method of claim 13, wherein the one or more communication parameters further include a parameter that indicates a permissible speed threshold for offloading to the second communication network, and wherein the operational information indicates a traveling speed of the communication device.

* * * * *